United States Patent [19]

Ross

[11] 4,219,309

[45] Aug. 26, 1980

[54] WIND POWER GENERATOR

[76] Inventor: Franklin Ross, 3998 Lake Mead Dr., Fremont, Calif. 94536

[21] Appl. No.: 916,503

[22] Filed: Jun. 19, 1978

[51] Int. Cl.² ............................................. F03D 5/06
[52] U.S. Cl. ..................................................... 416/80
[58] Field of Search .................... 417/334; 416/19, 79, 416/80; 290/44, 55

[56] References Cited

U.S. PATENT DOCUMENTS

| 263,069 | 8/1882 | Smith ................................ 416/79 X |
| 474,839 | 5/1892 | Lamphear ............................. 416/80 |
| 1,383,031 | 6/1921 | Schumaker ...................... 417/334 X |
| 1,490,787 | 4/1924 | Thornycroft ...................... 416/80 X |
| 4,104,006 | 8/1978 | Meiri ................................. 416/80 X |

FOREIGN PATENT DOCUMENTS 33366 6/1924 Denmark ................................... 416/80

*Primary Examiner*—Leonard E. Smith
*Attorney, Agent, or Firm*—Bielen and Peterson

[57] ABSTRACT

A wind power generator using an element opposing the force of the wind pivotally mounted and extending radially from the pivot. A counterweight also mounts to the pivot and extends radially from the same. The wind opposing element also mounts to another pivot between a first and second portion thereof. A second weight aids the turning of the wind opposing element about the first pivot to create a rocking motion of the counterweight.

9 Claims, 9 Drawing Figures

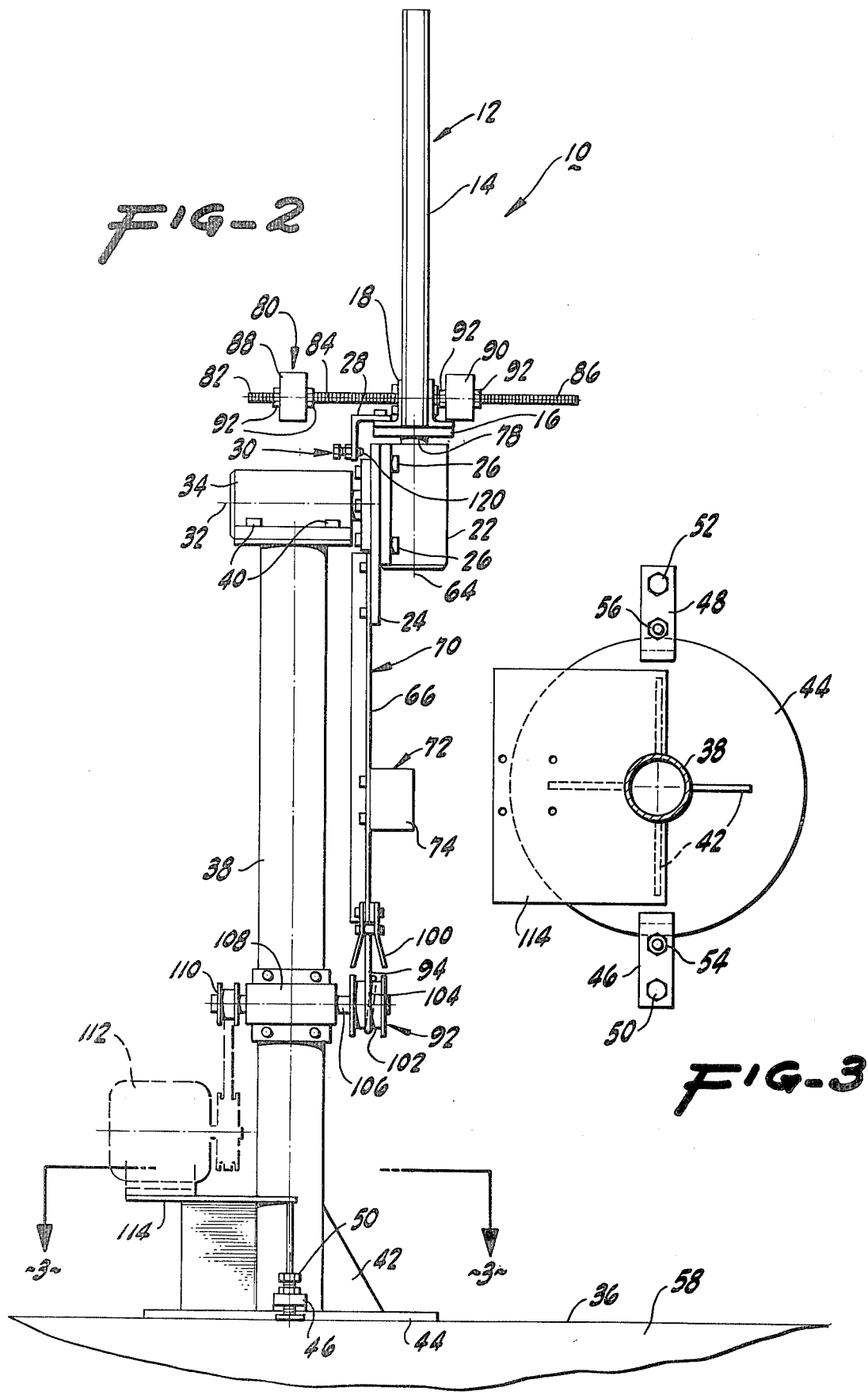

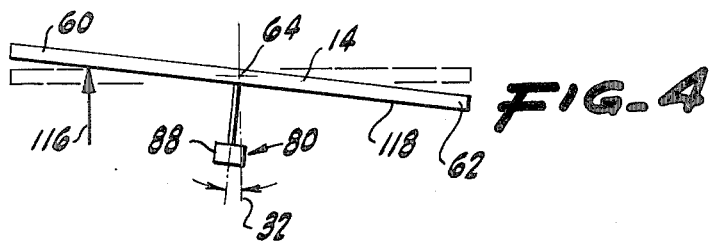
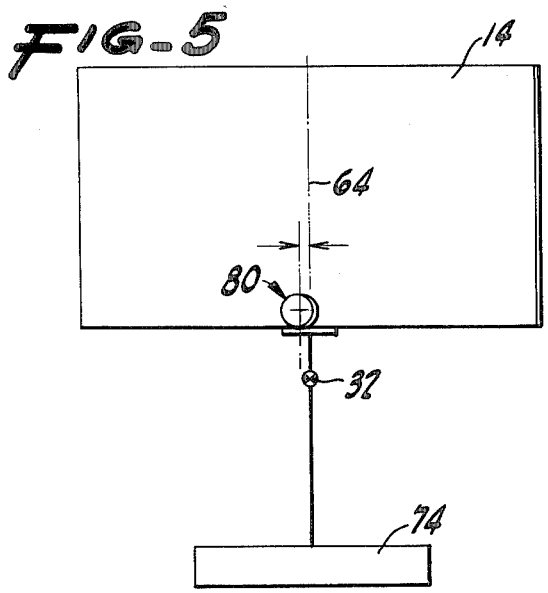
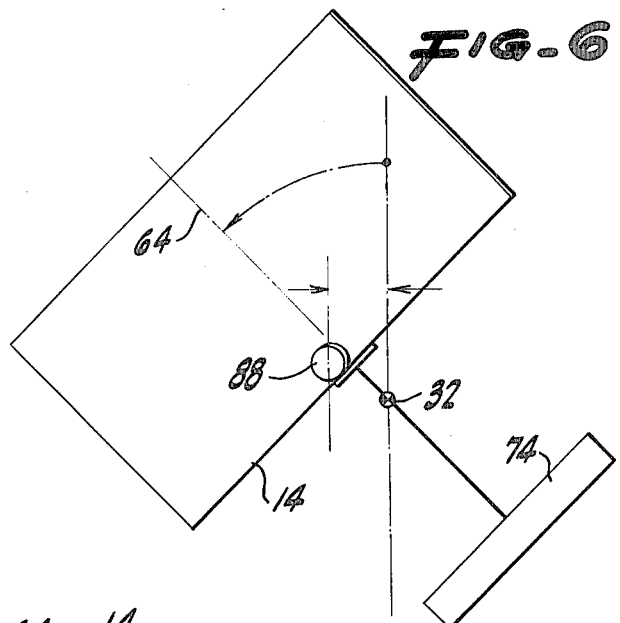
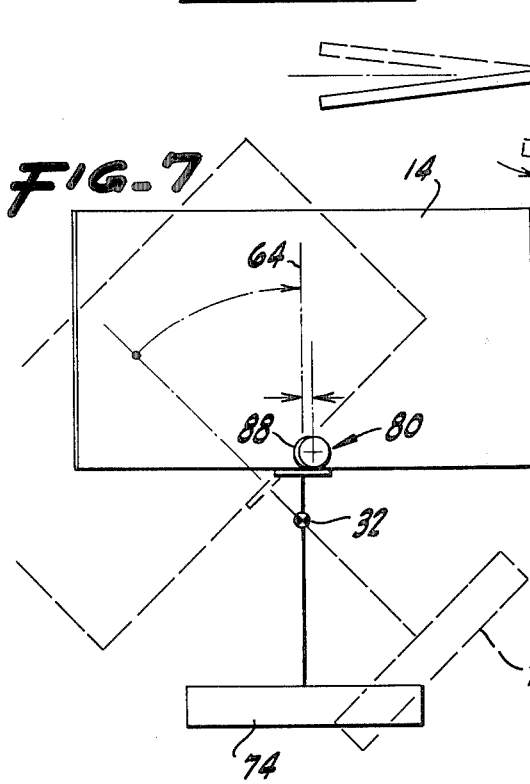
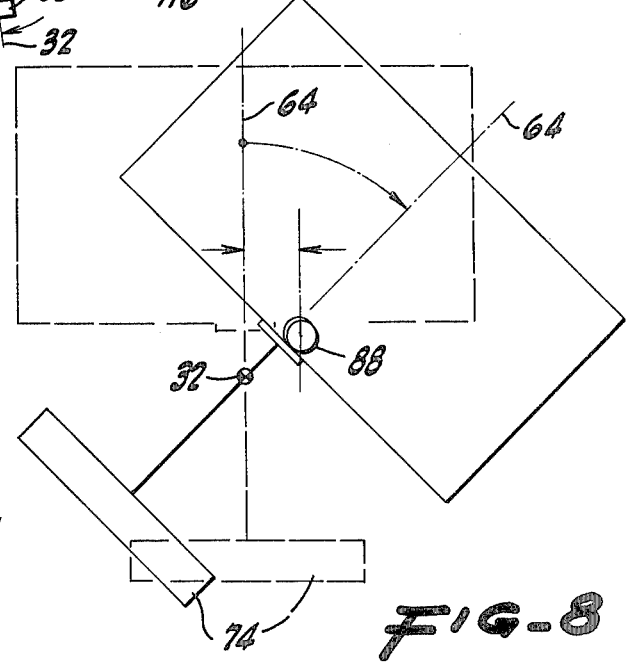

WIND POWER GENERATOR

BACKGROUND OF THE INVENTION

The present invention relates to a novel wind power generator.

Prior devices for using the wind as a source of power have centered on the principle of turning a wheel by the use of sails radiating from a vertical axis. The earliest known wind mills were constructed in Persia. These Persian wind mills were of the horizontal type with sails radiating from a vertical axis enclosed by building having an inlet and outlet for the wind. The vertical wind mill was fashioned on the Roman water mill and was first used in Europe in the twelfth century. Since that time various improvements have been made in the area of feathering, gearing, and governing. The use of wind mills has declined steadily with the development of the internal combustion engine and the efficient distribution of electrical power from all sources.

Recently, new interest has been sparked in wind power generation with the world wide shortage of fossil fuels. The basic windmill idea has not been improved on substantially and remains a relatively inefficient way to generate power.

SUMMARY OF THE INVENTION

In accordance with the present invention a novel wind power generator is provided. It includes as one of its elements, means for opposing the force of a wind mounted to a first pivot and extending radially therefrom. Such means may take the form of a sail having various configurations. The sail may be deemed to include a first portion and a second portion separated by an axis.

The invention further includes means for at least partially counterweighting the wind opposing means. The counterweighting means may take the form of a counterweight also mounted to the first pivot and extending radially therefrom in a direction different than the radial extension of the wind opposing means.

The wind opposing means mounts to a second pivot at the juncture or axis separating the first and second portions thereof. This permits the sail to move into independent paths.

The wind power generator of the present invention also embraces means for aiding the turning of the sail about the first pivot. This aiding means may take the form of a second weight positioned a certain distance perpendicularly away from the axis of the second pivot. In addition, this second weight may include means to adjust its distance from the axis of the second pivot and, therefore, away from the sail. One form of the invention may orient first pivot substantially perpendicular to the second pivot.

The motion of the wind power generator of the present invention may be described as pendulum-like. The mechanical pendulum motion may be transduced into other forms of power such as electricity, light, sound, and the like. By way of example, an alternator may be mechanically linked to the rocking or swinging counterweight.

It may be surmised that a new and useful wind power generator has been described.

It is therefore an object of the present invention to provide a wind power generator which is relatively cheap to manufacture and efficiently employs the force of a wind to produce usable power.

It is another object of the present invention to provide a wind power generator whose output of mechanical power is conveniently transduced into electrical power.

It is yet another object of the present invention to provide a wind power generator which uses a counterweighted sail which is mounted on a pair of pivots to permit the same to rock back and forth when counterweighted.

The invention possesses other objects and advantages, especially as concerns particular features and characteristics thereof, which will become apparent as the specification continues.

BRIEF DESCRIPTION OF THE DRAWINGS

FIG. 2 is a side elevational view of the invention with an alternator shown in phantom.

FIG. 3 is a view taken along line 3—3 of FIG. 2.

FIG. 4 is a top schematic view of the invention in one of its modes of operation.

FIG. 5 is a front schematic view of the invention in one of its modes of operation.

FIG. 6 is a front schematic view of the invention in one of its modes of operation.

FIG. 7 is a front schematic view of the invention showing two modes of operation thereof, one operation shown in phantom.

FIG. 8 is a front schematic view of the invention showing two modes of operation thereof, one mode of operation shown in phantom.

FIG. 9 is a top schematic view of the invention showing two modes of operation thereof, one mode shown in phantom.

Figure 1:
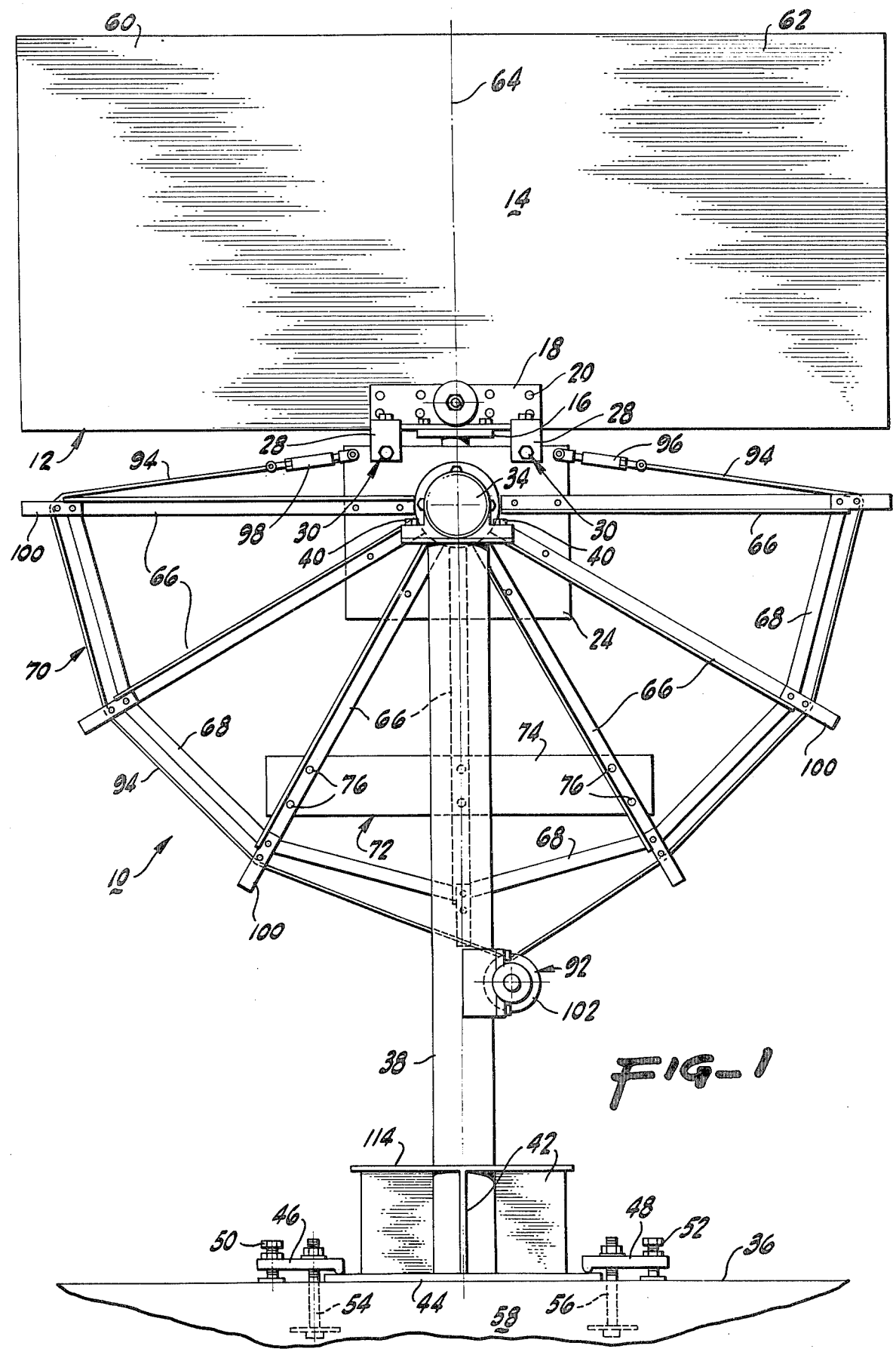
FIG. 1 is a front elevational view of the invention.

Various aspects of the present invention will evolve from the following detailed description of the preferred embodiments thereof which should be taken in conjunction with the accompanying drawings.

DESCRIPTION OF THE PREFERRED EMBODIMENTS

For a better understanding of the invention, references made to the following detailed description.

The invention as a whole is shown on the drawings and designated by reference character 10. The generator 10 includes as one of its elements means 12 for opposing the force of a wind. The wind would come from above the figure at an angle of ninety degrees. Means 12 may take the form of a sail or plate 14 constructed of plastic, wood, metal and the like. As shown in FIGS. 1 and 2, plate 14 affixes to a mounting pedestal 16 by the use of bracket 18 and fastening means 20. Pedestal 16 connects to member 22 which supports stop plate 24 the fastening means 26. "L" shaped member 28 forms stop means 30 whose function will be explained as the specification continues.

Means 12 is pivotally mounted about first pivot 32. Bearing 34 supports means 12 for rotation about first pivot 32. Bearing 34 is supported above ground surface 36 by column 38 which affixes to bearing 34 by the use of fastening means 40.

Turning to FIG. 3 it may be seen that column 38 terminates at its lower end in a quartet of braces 42 affixed to base 44. Base 44 is held firmly in place by bars 46 and 48 which include leveling means 50 and 52 at the outer end thereof. Anchor means 54 and 56 further support base 44. A concrete pad 58 further serves this supportive function. Thus, it may be seen that means 12 extends radially from pivot axis 32. Means 12 may be deemed to have a first portion 60 and a second portion 62 defined on either side of pivot 64, whose function will be more fully discussed as the specification continues.

Affixed to stop plate 24 are a plurality of diverging spokes interconnected at one end thereof by a series of struts 68. Spokes 66 and struts 68 form a fan shaped member 70 which supports means 72 for at least partially counterweighting wind opposing means 12. Means 72 must possess enough weight to prevent the structure above pivot 32 from being top heavy. Means 72 in the form of a counterweight 74 is securely fastened to a portion of spokes 66 by fastening means 76.

Means 12 further rotates about second pivot 64. Member 22 houses a bearing (not shown) which permits such rotation through the narrow portion 78 of pedestal 16. It should be noted that pivot 64 is at the juncture of first portion 60 and second portion 62 of wind opposing means 12.

The generator 10 further includes means 80 for aiding the turning of wind opposing means 12 about pivot 32. Means 80 take the form as shown in the drawings as an elongated shaft 82 having threaded portions 84 and 86 thereupon. Weights 88 and 90 are fixed along the length of shaft 82 by the use of pairs of nuts 92 and 94.

Mechanical power originating from generator 10 may be transformed into other energy forms such as electricity, sound, and the like. As such, generator 10 may include means 92 for transducing power from generator 10. Means 92 may include a cable 94 fastened at both ends to plate 24 by shackles 96 and 98. A plurality of roughly U-shaped members 100 found at the extremities of the plurality of spokes 66 maintain cable 94 away from pivot 32. A drum 102 fixed to column 38 frictionally engages one turn 104 of cable 94. Drum 102 connects to shaft 106 which passes through bearing 108 to the other side of the column 38 and 110 of shaft 106 may connect to an alternator 112 to produce electrical energy. Platform 114 fixed to base 44 may support alternator 112. Other devices may connected to end 110 of shaft 106 such as compressors, pumps, and the like.

It may be seen that weight 74 serves as a pendulum around the axis of pivot 32. Weight 74 may be placed along the axis of second pivot 64 in spaced relation from wind opposing means 12. Weight 74 may also be placed in a direction perpendicular from the extension of the axis of pivot 64 below the axis of pivot 32. However, such an imbalance would cause wear on the bearings as shown. In operation, FIG. 4, a wind force 116 pushes on the front surface 118 of plate 14. The slight imbalance of wind (wind force 116) acting on plate 14 supported on pivot 64 will cause plate 14 to rotate clockwise or counterclockwise, depicted as clockwise in FIG. 4. Means 80 will turn clockwise about pivot 64 (FIG. 4) with plate 14 such that the center of gravity of weight 88 is outside a plane passing vertically through the axis of pivot 32, FIGS. 4 and 5. As shown in FIG. 6 plate 14 will tend to rotate counterclockwise about pivot 32 thus lifting the center of gravity of weight 74. The further shearing action of wind force 116 and the gravitational pull on weight 74 will tend to drive sail 14 clockwise around pivot 32, FIG. 7 such that this clockwise motion of sail 14 about pivot 32 causes angular momentum in weight 88 about pivot 64 such that the center of gravity of weight 88 crosses the plane passing vertically through the axis of pivot 32 thus forcing plate 14 downwardly in a clockwise direction about pivot 32, as shown in FIG. 8. Weight 74 then travels in a clockwise direction about pivot 32 thus lifting its center of gravity again. Turning to FIG. 9 we see that the pivotal movement of weight 88 about pivot 64 forces plate 14 to also pivot about pivot 64 thus permitting wind force 116 to drive plate 14 counterclockwise about pivot 32 to repeat the cycle. In essence, weight 74 and plate 14 rock back and forth about pivot 32. It has been found that relatively low levels of wind velocity will initiate and maintain this rocking motion. Means 80 may be adjusted to sensitize the initial rocking motion by fixing the distance between weights 88 and 90, FIG. 2. It has been found that limiting the rotation of plate 14 to approximately ten degrees produces a gentle rocking motion in light to moderate winds. It this regard, stop means 30 includes a pair of plate engaging members 120 (one not shown), FIG. 2, whose abutment on plate 24 stops the rotation of plate 14 about pivot 64.

While in the foregoing specification embodiments of the invention have been set forth in considerable detail for the purposes of making a complete disclosure of the invention, it will be apparent to those of ordinary skill in the art that numerous changes may be made in such details without departing from the spirit and principles of the invention.

What is claimed is:

1. A wind power generator comprising:
   a. means for opposing the force of a wind, said means being mounted to a first pivot and extending radially therefrom, said wind opposing means having a first portion and a second portion, said wind opposing means being mounted to a second pivot at the juncture of said first and second portions of said wind opposing means;
   b. means for at least counterweighting said wind opposing means, said counterweighting means being mounted to said first pivot and extending radially therefrom such that the axis of said first pivot is interposed said wind force opposing means and said means for at least counterweighting said wind opposing means, said means for at least counterweighting said wind opposing means comprising a first weight selectively fixed effectively along the axis of said second pivot;
   c. means for aiding the turning of said wind opposing means about said first pivot.

2. The wind power generator of claim 1 which additionally comprises means for transducing power from said generator.

3. The wind power generator of claim 1 in which said first pivot is oriented substantially perpendicularly with respect to said second pivot.

4. The wind power generator of claim 1 in which said means for opposing the force of a wind includes a plate and said second pivot includes a rotatable axle.

5. The wind power generator of claim 1 in which said means for aiding the turning of said wind opposing means about said first pivot comprises a second weight positioned a certain distance perpendicularly away from the portion of the axis of said second pivot where said wind force opposing means is found.

6. The wind power generator of claim 5 in which said second weight includes means for adjusting its distance perpendicularly from the axis of said second pivot.

7. The wind power generator of claim 6 in which said first pivot is oriented substantially perpendicularly with respect to said second pivot.

8. The wind power generator of claim 7 which additionally comprises means for transducing power from said generator.

9. The wind power generator of claim 8 in which said power transducing means includes an alternator mechanically linked to said counterweighting means.

* * * * *